J. S. TUKEY.
FISHING TACKLE.
APPLICATION FILED APR. 14, 1917.

1,250,053. Patented Dec. 11, 1917.

WITNESSES
F. C. Barry
W. E. Beck

INVENTOR
James S. Tukey
BY
Munn & Co
ATTORNEYS

UNITED STATES PATENT OFFICE.

JAMES S. TUKEY, OF BELGRADE, MAINE.

FISHING-TACKLE.

1,250,053.   Specification of Letters Patent.   Patented Dec. 11, 1917.

Application filed April 14, 1917. Serial No. 161,986.

*To all whom it may concern:*

Be it known that I, JAMES SAMUEL TUKEY, a citizen of the United States, and a resident of Belgrade, in the county of Kennebec and State of Maine, have invented certain new and useful Improvements in Fishing-Tackle, of which the following is a specification.

My invention is an improvement in fishing tackle and has for its object to provide mechanism to be arranged between the line and the hook, for permitting the hook to yield with respect to the line, and to turn with respect to the line, and wherein said means will act as a sinker for the hook.

In the drawings:—

Figure 1:
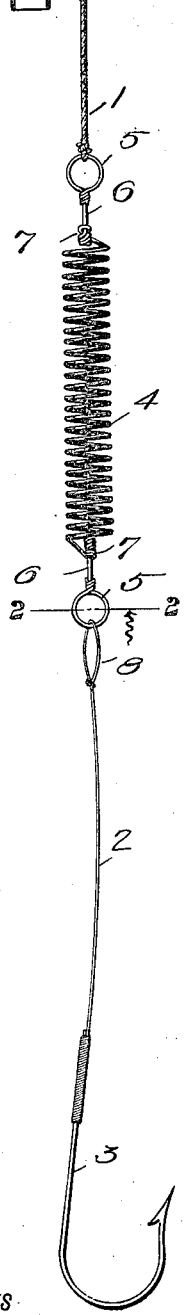
Figure 1 is a front view of the attachment in place.
Figures 2, 4:
Fig. 2 is a section on the line 2—2 of Fig. 1, looking in the direction of the arrow adjacent the line.
Fig. 4 is an end view.

In the embodiment of invention shown in Figs. 1 and 2, the line 1 is connected to the leader 2 of the hook 3, by means of a coil spring 4. At each end of the coil spring is arranged an eye 5, each eye having a shank 6, which is swiveled in an eye 7 on the adjacent end of the spring, in such manner that the shank of the ring may turn in the eye on an axis corresponding with the axis of the spring. The line 1 is connected to the eye 5 while the leader 2 has a loop 8 for connection with the eye 5 at the other end of the spring.

With the improved attachment, the hook may yield with respect to the line to prevent breakage and it may turn with respect to the ring to prevent twisting of the line and to prevent tearing of the hook from the fish's mouth, and at the same time the spring serves as a sinker for the hook.

Figures 3, 5, 6:
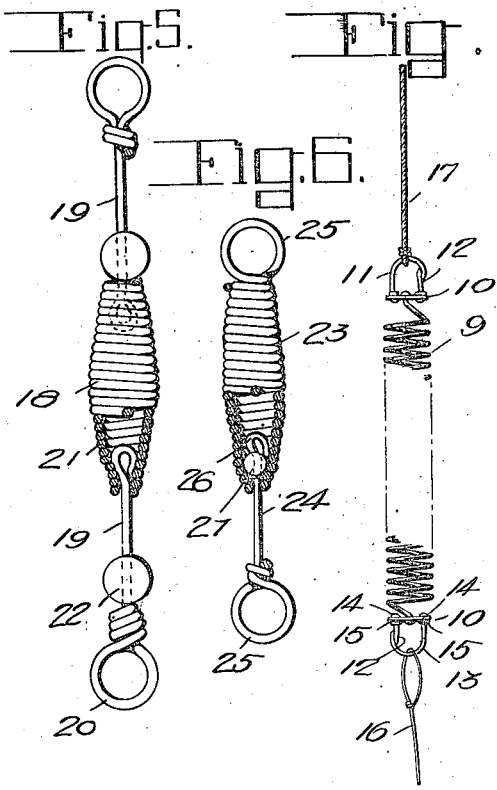
Fig. 3 is a front view of a modified construction.
Figs. 5 and 6 are side views with parts in section of modified constructions.

In the embodiment of invention shown in Figs. 3 and 4, the spring 9 has swiveled on each of its ends a plate 10, and a substantially U-shaped member consisting of sections 11 and 12 is connected with each plate, the arms of the U-shaped members being passed through openings in the ends of the plate and headed as shown at 14, each arm having a stop 15 at the outer side of the plate. These U-shaped members 12—13 are in effect snap hooks, and the leader 15 is connected with one swivel, the leader 16 being connected with the other.

In the embodiment of the invention shown in Fig. 5 the spring 18 has its ends reduced as shown and in each end is swiveled a shank 19, the said shanks having eyes 20 at their outer ends for engagement by the line and leader respectively. The inner end of each shank has a head 21 which by engagement with the reduced portion of the spring prevents disengagement of the shank. A metal ball 12 is mounted on each shank.

In the embodiment of the invention shown in Fig. 6 the spring 23 has its ends reduced in the same manner as those of the spring 18, and shanks 24 are swiveled in their ends. The shanks have eyes 25 at their outer ends and heads 26 at their inner ends and balls 27 are mounted on the shanks at the heads, the balls being within the spring. The head 21 of Fig. 5, and the balls and heads of Fig. 6 prevent disengagement of the shanks but permit rotation of the same.

I claim:—

Fishing tackle, comprising in combination with the hook and the line, of a coil spring interposed between the hook and the line and serving as a sinker, shanks swiveled in the ends of the spring, each shank having an eye for connection with the line and leader of the hook, respectively, each shank having a head for preventing disengagement thereof.

JAMES S. TUKEY.